(12) United States Patent
Dinan et al.

(10) Patent No.: US 8,213,949 B1
(45) Date of Patent: Jul. 3, 2012

(54) ADJUSTABLE MODULATION FOR OVERHEAD INFORMATION IN WIRELESS COMMUNICATION NETWORKS

(75) Inventors: Esmail Hejazi Dinan, Herndon, VA (US); Daniel A. Vivanco, Herndon, VA (US); Howard Bishop Anderson, Ashburn, VA (US); Hemanth Balaji Pawar, Herndon, VA (US); Vijay Rudraraju, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 576 days.

(21) Appl. No.: 12/324,228

(22) Filed: Nov. 26, 2008

(51) Int. Cl.
*H04W 72/08* (2009.01)
*H04W 4/18* (2009.01)

(52) U.S. Cl. .................. 455/452.1; 370/329

(58) Field of Classification Search .......... 455/452.1, 455/542.2, 450; 370/329, 331, 332
See application file for complete search history.

(56) References Cited

U.S. PATENT DOCUMENTS

| | | | |
|---|---|---|---|
| 2003/0053549 A1* | 3/2003 | Uesugi | 375/261 |
| 2005/0107036 A1* | 5/2005 | Song et al. | 455/23 |
| 2005/0213674 A1* | 9/2005 | Kobayashi | 375/259 |
| 2009/0213802 A1* | 8/2009 | Miki et al. | 370/329 |

FOREIGN PATENT DOCUMENTS

JP 2007336496 A * 12/2007

\* cited by examiner

*Primary Examiner* — Howard Williams
(74) *Attorney, Agent, or Firm* — O'Brien Jones PLLC

(57) ABSTRACT

What is claimed is a method of transferring overhead information in a wireless communication system, where the overhead information is encoded with a first modulation scheme, and where the overhead information is wirelessly transferred to a plurality of wireless communication devices in communication with the wireless communication system. The method includes receiving signal quality information from each of the plurality of wireless communication devices, processing the signal quality information to determine a second modulation scheme for the overhead information, where the second modulation scheme is determined to allow the overhead information to be decoded by each of the plurality of wireless communication devices, and the second modulation scheme is of a higher order of modulation than the first modulation scheme. The method also includes transferring an indicator of the second modulation scheme to the plurality of wireless communication devices, and transferring the overhead information to the plurality of wireless communication devices encoded with the second modulation scheme.

22 Claims, 5 Drawing Sheets

ADJUSTABLE MODULATION FOR OVERHEAD INFORMATION IN WIRELESS COMMUNICATION NETWORKS

TECHNICAL FIELD

Aspects of the disclosure are related to the field of communications, and in particular, communication modulation in wireless networking protocols for wireless communication networks.

TECHNICAL BACKGROUND

Wireless communication networks typically include wireless communication devices which, via a wireless communication system, communicate with further communication networks and equipment. The wireless communication system typically routes user communications over wireless links from the wireless communication devices to further communication networks, equipment, and destinations.

In addition to user communications, the wireless communication devices are configured to receive overhead information over the wireless links. The overhead information typically includes non-user communications and commands related to the underlying operation of the particular wireless communication protocol employed over the wireless links. However, the overhead information can consume a large portion of the limited resources of the wireless links. Unfortunately, performance of communications transferred to and from the wireless communication devices can suffer, as the modulation scheme typically employed for overhead information must be of a low quality to ensure that all wireless communication devices in communication with the wireless communication system can decode the overhead.

OVERVIEW

What is claimed is a method of transferring overhead information in a wireless communication system, where the overhead information is encoded with a first modulation scheme, and where the overhead information is wirelessly transferred to a plurality of wireless communication devices in communication with the wireless communication system. The method includes receiving signal quality information from each of the plurality of wireless communication devices, processing the signal quality information to determine a second modulation scheme for the overhead information, where the second modulation scheme is determined to allow the overhead information to be decoded by each of the plurality of wireless communication devices, and the second modulation scheme is of a higher order of modulation than the first modulation scheme. The method also includes transferring an indicator of the second modulation scheme to the plurality of wireless communication devices, and transferring the overhead information to the plurality of wireless communication devices encoded with the second modulation scheme.

What is also disclosed is a communication system. The communication system includes a plurality of wireless communication devices in communication with a wireless communication system. The wireless communication system is configured to encode overhead information with a first modulation scheme, and wirelessly transfer the overhead information to the plurality of wireless communication devices. The wireless communication system is also configured to receive signal quality information from each of the plurality of wireless communication devices, process the signal quality information to determine a second modulation scheme for the overhead information, where the second modulation scheme is determined to allow the overhead information to be decoded by each of the plurality of wireless communication devices, and the second modulation scheme is of a higher order of modulation than the first modulation scheme. The wireless communication system is also configured to transfer an indicator of the second modulation scheme to the plurality of wireless communication devices, and transfer the overhead information to the plurality of wireless communication devices encoded with the second modulation scheme.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
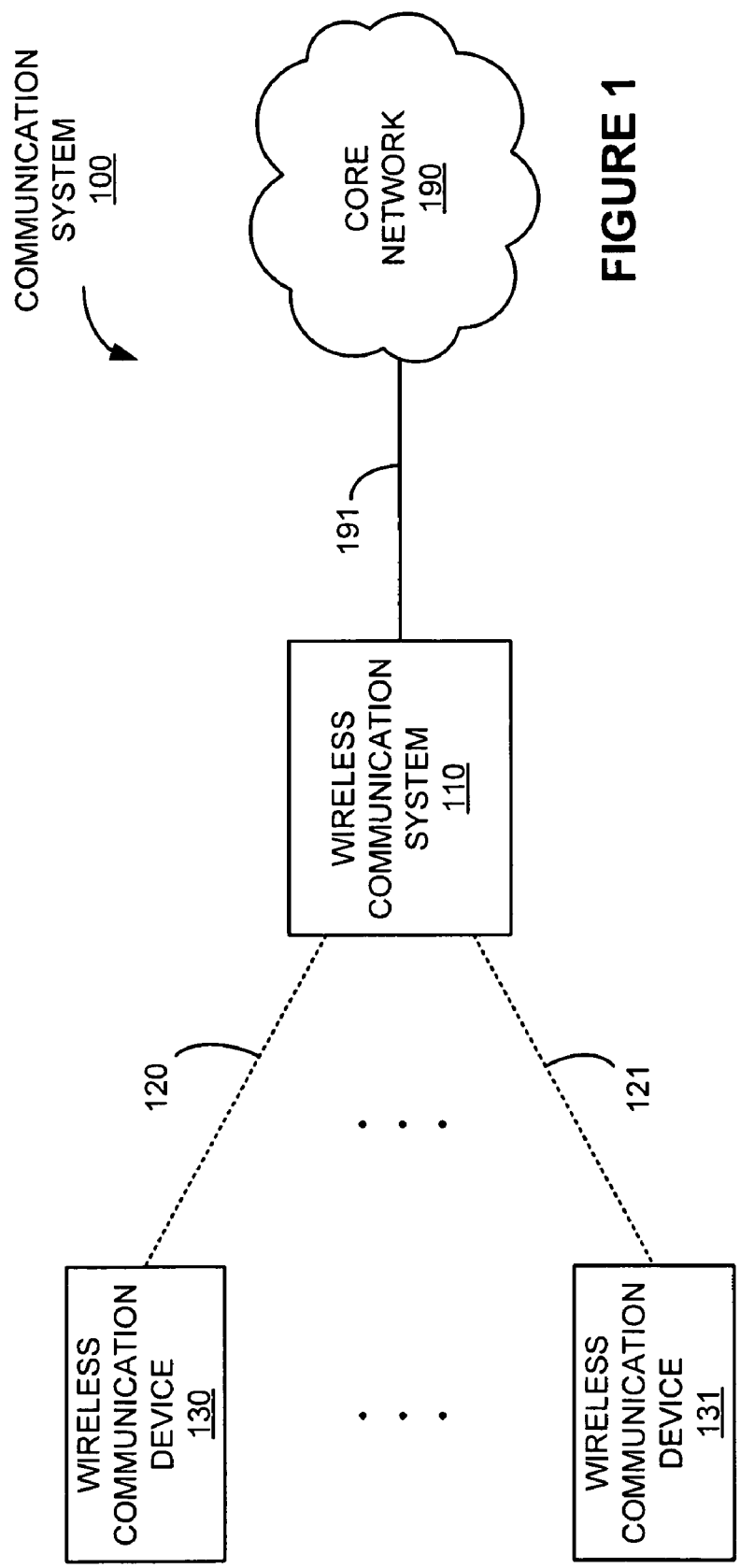
FIG. 1 is a system diagram illustrating a communication system.

FIG. 1 is a system diagram illustrating communication system 100. Communication system 100 includes wireless communication system 110, wireless communication devices 130-131, and core network 190. Wireless communication system 110 and wireless communication device 130 communicate over wireless link 120. Wireless communication system 110 and wireless communication device 131 communicate over link 121.

Wireless communication system 110 and core network 190 communicate over link 191.

Wireless communication system 110 includes wireless communications equipment capable of communicating with wireless communication device 130. Examples of wireless communication system 110 can include access nodes, base stations, base transceiver stations, boomer stations, antennas, radio node controllers (RNC), mobile switching controllers, packet data serving nodes (PDSN), subscriber profile systems (SPS), authentication, authorization, and accounting (AAA) equipment, home agents, call processing equipment, wireless access points, Internet routers, network gateways, systems as well as other type of communication equipment including combinations thereof.

Wireless communication device 130 and wireless communication device 131 each comprises a telephone, transceiver, computer, digital assistant, smart phone, Internet appliance, or some other wireless communication apparatus—including combinations thereof. Although only wireless communication devices 130-131 are shown in FIG. 1, it should be understood that in other examples a different number of wireless communication devices could be included in communication system 100.

Core network 190 could include an Internet network, wireless network, telephony network, optical network, enterprise network, local area network, or some other type of communication network or communication equipment—including combinations thereof.

Wireless links 120-121 use various communication media, such as air, space, or some other wireless transport media—including combinations thereof. Wireless links 120-121 use various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format—including combinations, improvements, or variations thereof.

Wireless links 120-121 may comprise many different signals sharing the same link. Wireless links 120-121 could include multiple signals operating in a single "airpath"—as represented by the dashed lines in FIG. 1—comprising beacon signals, user communications, communication sessions, overhead communications, frequencies, timeslots, transportation ports, logical transportation links, network sockets, packets, or communication directions. For example, user communications between wireless communication device 130 and wireless communication system 110 could share the same representative wireless link 120, but be transferred over different communication sessions, frequencies, timeslots, packets, ports, sockets, logical transport links, or in different directions—including combinations thereof.

Link 191 uses various communication media, such as air, space, metal, optical fiber, or some other signal propagation path—including combinations thereof. Link 191 could be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Link 191 could be a direct link or might include various equipment, intermediate components, systems, and networks. Link 191 could include multiple signals operating in a single pathway in a similar manner as wireless links 120-121.

Figure 2:
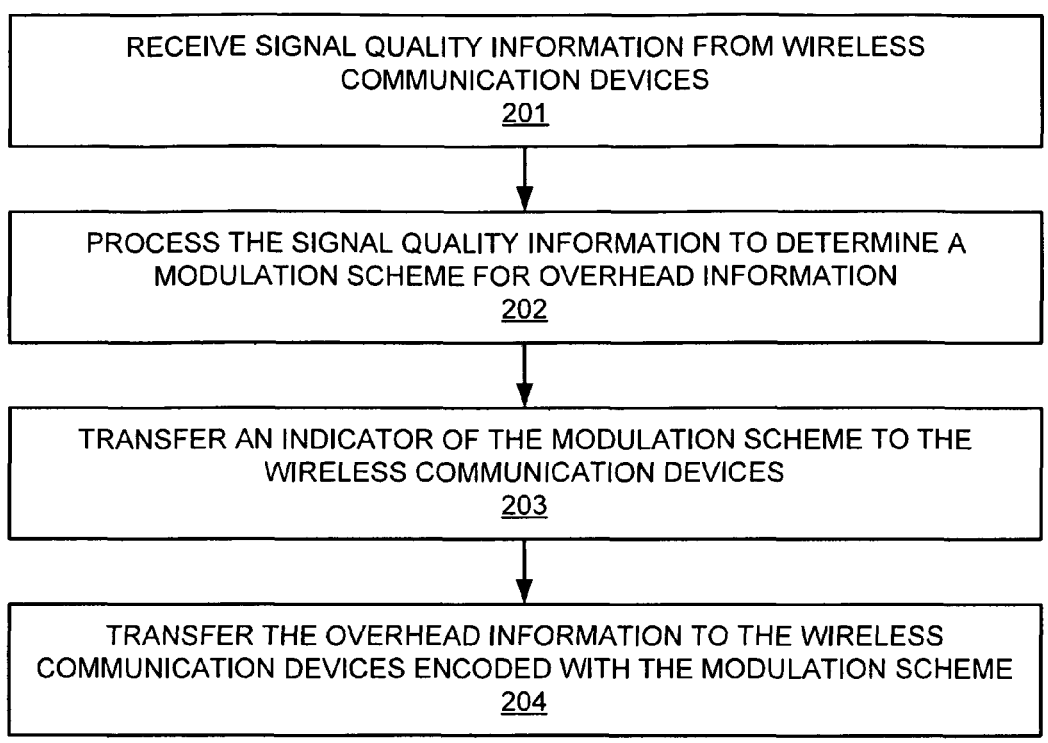
FIG. 2 is a flow diagram illustrating a method of operation of a communication system.

FIG. 2 is a flow diagram illustrating an example method of operation of communication system 100, as found in FIG. 1. The phases illustrated in FIG. 2 are listed herein parenthetically.

In the example in FIG. 2, wireless communication system 110, exchanges overhead information with wireless communication devices 130-131 over wireless links 120-121. The overhead information includes non-user communication information and commands related to the operation of the particular wireless communication protocol employed over wireless links 120-121. Examples of overhead information include communication channel arrangement and assignments, downlink and uplink mappings, frame control, preambles, pilot channels, beacon signals, among other information. In WiMAX examples, the overhead information includes preambles, frame control information (FCH), downlink mapping (DL-MAP) and uplink mapping (UL-MAP) information, downlink overhead information channel (DCD) and uplink overhead information channel (UCD) description information, among other information.

The overhead information and user communications are also, in typical examples, encoded using a modulation scheme. However, the modulation scheme typically employed for overhead information must be of a low order of modulation, or of a less efficient type, to ensure that all wireless communication devices in communication with, and attempting to initiate communication through wireless communication system 110, can decode the overhead information properly.

For example, a wireless communication device attempting to initiate communications through wireless communication system 110 must first perform a handshaking and ranging operation to register with wireless communication system 110. This handshaking and ranging operation includes receiving overhead information from wireless communication system 110, as well as transferring overhead information to wireless communication system 110. However, if the wireless communication device attempting to initiate communications does not know the modulation scheme employed for overhead communications for wireless communication system 110, the overhead information received from wireless communication system 110 can not be properly decoded or demodulated, nor can overhead information transferred to wireless communication system 110 be properly encoded or modulated.

Thus, a predetermined modulation scheme is employed, in typical examples, to allow all existing and initiating wireless communication devices to receive and decode the overhead information from wireless communication system 110. The predetermined modulation scheme is also, in typical examples, of a low "order" of modulation as well as of a less efficient "type" of modulation. This low order and low efficiency type of modulation scheme is selected to ensure that wireless communication devices both near to and far from wireless communication system 110 can properly exchange the overhead information.

For example, as the order of modulation increases, and consequently the potential bandwidth of communications, the distance over which wireless communications can reliably occur decreases. Likewise, as the type of modulation increases to a more efficient type, the distance over which communications can reliably occur also decreases. Unfortunately, using a predetermined modulation scheme of low order and type can lead to inefficient use of wireless links 120-121, as well as overcrowding of the resources of wireless communication system 110. This low order and type of modulation can also leave less available bandwidth for user communications, as a large portion of the available bandwidth must be dedicated to inefficiently modulated overhead communications.

In examples of wireless communication protocols, only certain types of modulation are supported by wireless communication systems and wireless communication devices. These modulation types can include quadrature-amplitude modulation (QAM), frequency-shift keying (FSK), phase-shift keying (PSK), quadrature phase shift keying (QPSK), among other encoding schemes. Also, within some types of modulation, a different order of modulation can exist. The order of modulation typically refers to the number of bits able to be transferred per unit symbol of the particular type of modulation scheme. For example, in the QAM type of modulation, an order of 64 would potentially allow for 64 bits of data for every encoded piece, or symbol, of communications, and would be referred to as 64-QAM. Other orders and types of modulation would have a similar representation.

In the example shown in FIG. 1, an original, or first, modulation scheme is used to encode the overhead information. In some examples, this first modulation scheme is predetermined and stored, possibly on a computer-readable medium, in each of wireless communication devices 130-131.

Wireless communication system 110 receives (201) signal quality information from wireless communication devices 130-131. The signal quality information could be received over wireless links 120-121. In some examples, the signal quality information is transferred over a channel quality indicator channel within wireless links 120-121. In other examples, the signal quality information can be determined by wireless communication system 110 during an initial ranging process for new wireless communication devices seeking to register or initiate communications with wireless communication system 110.

Wireless communication system 110 processes (202) the signal quality information to determine a new, or second, modulation scheme for overhead information exchanged between wireless communication devices 130-131 and wireless communication system 110. In this example, the modulation scheme adjusted to allow the overhead information to be decoded by each of wireless communication devices 130-131, but still be of a higher order, or more efficient type, of modulation than the first, or original, modulation scheme. In many examples, the overhead modulation scheme would be different—and determined independently—from any modulation scheme used for user communications.

The signal quality information will allow wireless communication system 110 to make a determination on how high of an order of modulation or type of modulation could be potentially employed successfully. The signal quality of wireless links 120-121, in typical examples, depends upon factors such as the distance of wireless communication devices 130-131 from wireless communication system 110, the amount or type of obstructions in the line-of-sight of wireless links 120-121, weather, temperature, ground cover, the transceiver equipment of both wireless communication system 110 and wireless communication devices 130-131, or other factors in communication system 100.

Wireless communication system 110 then transfers (203) an indicator of the new modulation scheme to wireless communication devices 130-131 over wireless links 120-121. In some examples, this indicator is transferred in the overhead communications over wireless links 120-121. In WiMAX examples, the DCD or UCD portion of the overhead communications could be used to transfer the indicator of the new modulation scheme, and the modulation scheme would be received by all wireless communication devices in communication with wireless communication system 110, such as wireless communication devices 130-131. In other examples, other portions of the overhead information, or even portions of the user communications, could be used to transfer the indicator of the new overhead modulation scheme.

Wireless communication system 110 then transfers (204) the overhead information to wireless communication devices 130-131 encoded with the new modulation scheme. In further examples, wireless communication devices 130-131 also transfer overhead information to wireless communication system 110 encoded with the new modulation scheme. Also, as conditions in communication system 100 change, such as the factors discussed above which impact the signal quality, wireless communication system 110 may again process subsequent signal quality information transferred from wireless communication devices 130-131 to determine a suitable modulation scheme.

Advantageously, once the adjustable modulation scheme employed for the overhead communications over links 120-121 has been increased to a more efficient modulation type or a higher order of modulation, more efficient use of the resources of wireless links 120-121 can be achieved. In this manner, more bandwidth could then be available for user communications or to allow more wireless communication devices to communicate with wireless communication system 110, among other advantages.

In further examples, in addition to, or alternately from, the adjustable modulation scheme, an adjustable coding scheme could be employed for the overhead information based upon the signal quality information. Wireless communication system 110 could determine a new coding scheme, or error correction scheme, and transfer an indicator of the new coding scheme to wireless communication devices 130-131, and subsequently transfer the overhead information to wireless communication devices 130-131 using the error correction scheme.

A coding scheme can indicate an error correction or encoding scheme to reduce data errors or add redundancy in communications. Some examples include error-correcting codes (ECC), checksums, forward-error correction (FEC), block coding, convolutional coding, and Reed-Solomon coding, among others. In many examples of FEC, redundant data bits are added into the communications to allow the recipient to validate the communications were properly received, or to aid in detection and correction of errors. The number of redundancy bits used could be varied based upon many factors, and in this example, could be based upon the signal quality information of the wireless communication devices, among other factors. If a lower number of redundancy bits in the FEC coding scheme could be tolerated by wireless communication devices, a coding scheme with a smaller % of redundant bits could be selected. Advantageously, this smaller % of redundant bits could free up bandwidth of the overhead portion of the wireless link for user communications and lead to a higher data rate.

In other examples, other information could be processed to determine a modulation scheme or coding scheme of the overhead communications. This other information could include the application types of the user communications exchanged over wireless links 120-121, a level of traffic over wireless links 120-121, a level of traffic through wireless communication system 110, the quantity of wireless communication devices in communication with wireless communication system 110, the geographic location of wireless communication devices 130-131, among other information.

Figure 3:
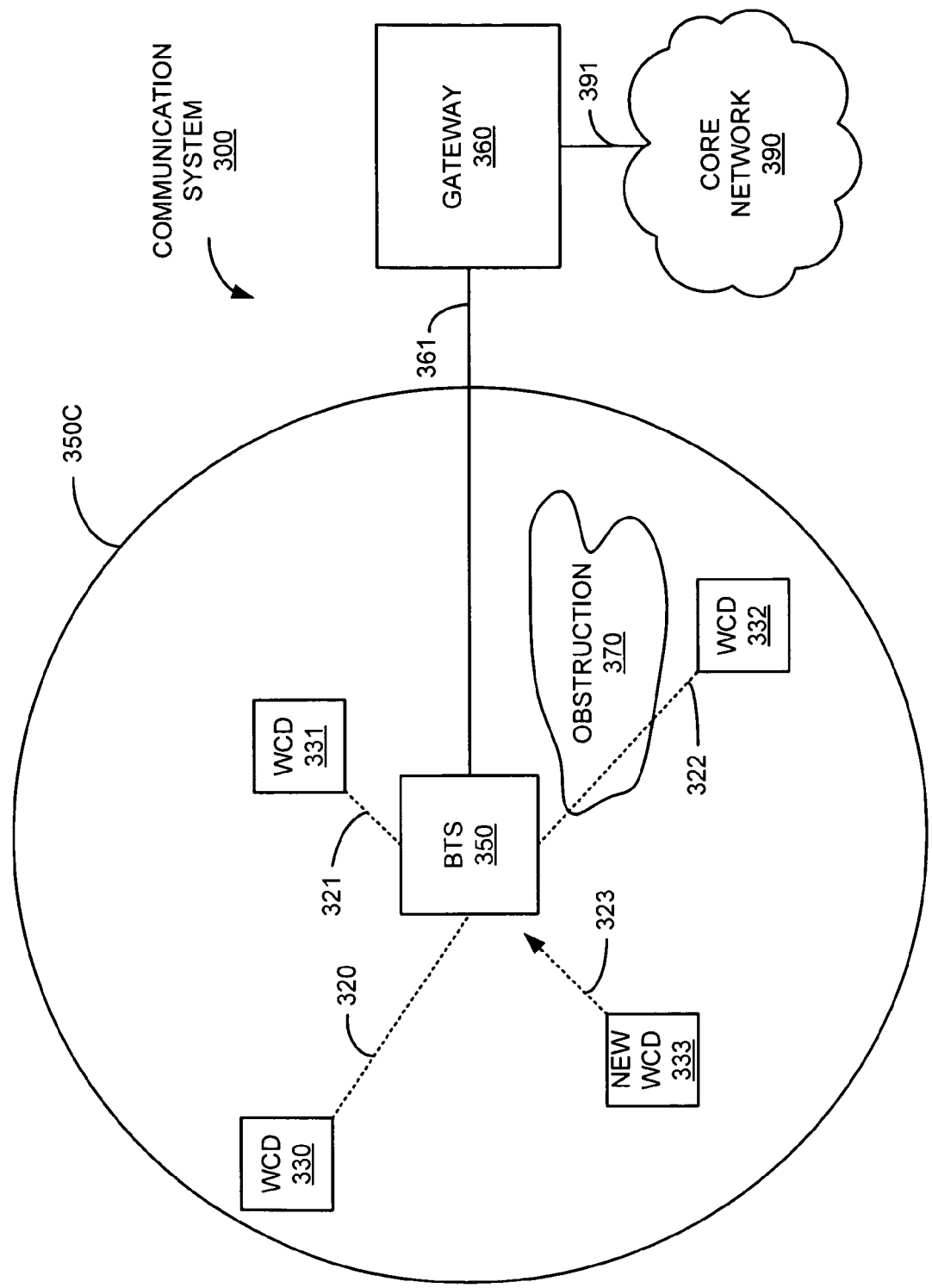
FIG. 3 is a system diagram illustrating a communication system.

FIG. 3 is a system diagram illustrating communication system 300. Communication system 300 includes wireless communication devices (WCD) 330-333, base transceiver station (BTS) 350, gateway 360, and core network 390.

BTS 350 and WCD 330-332 communicate over wireless links 320-322, respectively. WCD 333 is attempting to initiate communications through BTS 350 over wireless link 323, and indicated by the arrowhead on wireless link 323. BTS 350 and gateway 360 communicate over link 361. Gateway 360 and core network 390 communicate over link 391. Also, as shown in FIG. 3, obstruction 370 is in the line-of-sight of wireless link 322.

WCD 330-333 each comprise a telephone, transceiver, computer, digital assistant, smart phone, Internet appliance, or some other wireless communication apparatus—including combinations thereof.

BTS 350 includes base station equipment, antennas, transceivers, and other equipment for communicating with and controlling WCD 330-333. BTS 350 could also include other types of communications network equipment capable of communicating with WCD 330-333. It should be understood that communication system 300 could include further communications equipment for communicating with and controlling BTS 350.

Communication system 300 shows BTS 350 situated in a circular region of coverage 350C. The circular shape should be understood to be merely symbolic of an overhead view of a region of wireless coverage, and should not be interpreted as an exact physical representation of such a region. In many examples, a region of coverage is served by a single antenna, antenna tower, or BTS. Wireless communication devices can be located throughout the regions of coverage. Although WCD 330-333 are shown in FIG. 3, it should be understood that in various examples of communication system 300, a different number of wireless communication devices could be located in and distributed throughout region of coverage 350C of communication system 300.

Gateway 360 acts as a gateway for communications between WCD 330-333 within coverage area 350C of communication system 300 and core network 390. Examples of gateway 360 can include access service network gateways (ASN-GW), mobile switching controllers (MSC), packet data serving nodes (PDSN), call processing equipment, home agents, radio node controllers (RNC), subscriber profile systems (SPS), authentication, authorization, and accounting (AAA) equipment, wireless access points, Internet routers, network gateways, systems as well as other types of communication equipment—including combinations thereof.

Core network 390 includes a core network of the service provider in this example, comprising an Internet network, local area networks, or other telecommunications equipment and networks. In some examples, core network 390 acts as a gateway for communications between gateway 360 and further wireless communication systems, the Internet, or telephony systems.

In this example, link 361 comprises a T1 connection, and link 391 comprises an optical networking connection. Wireless links 320-323 each comprise a wireless link operating using the WiMAX protocol in this example.

Figure 4:
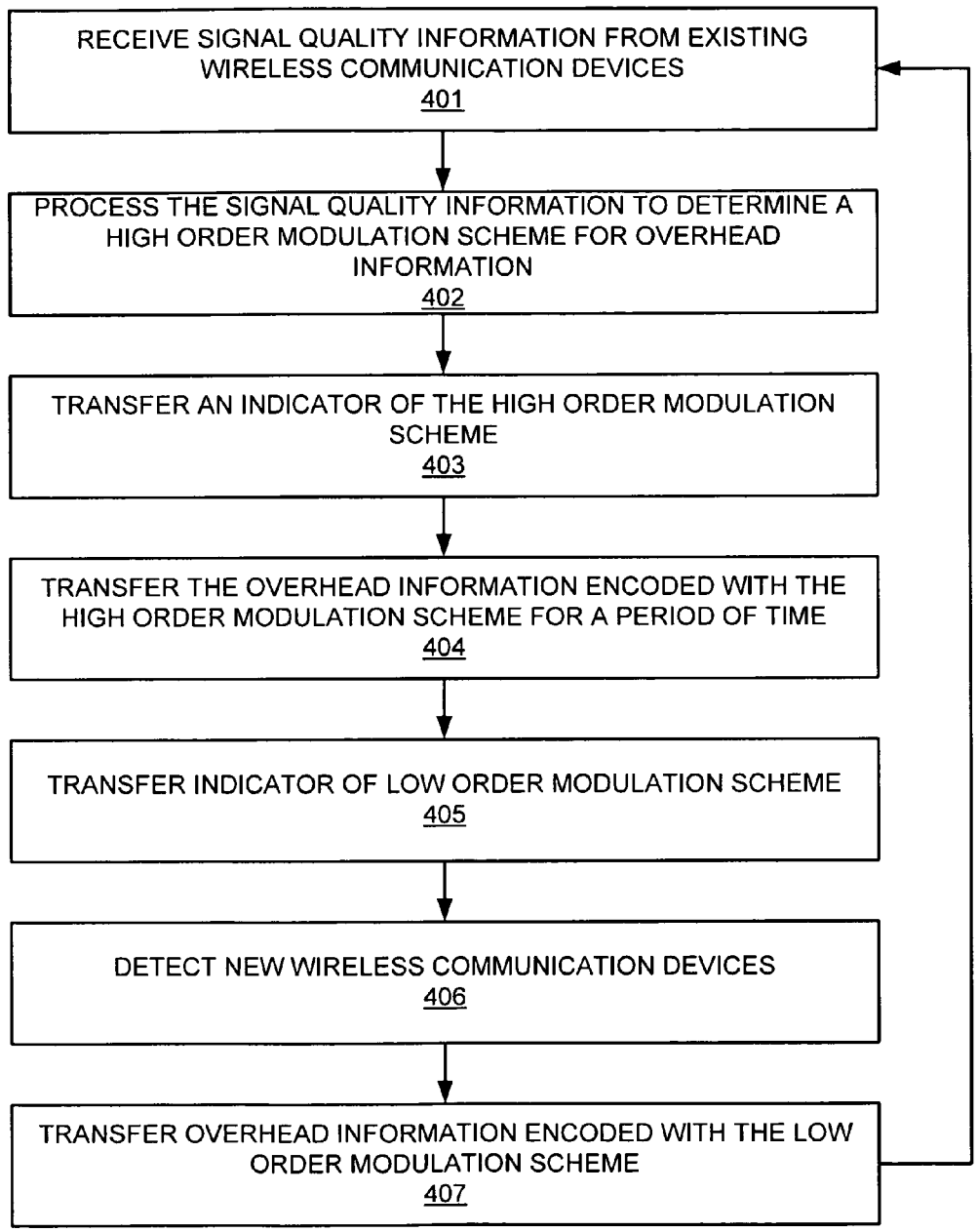
FIG. 4 is a flow diagram illustrating a method of operation of a communication system.

FIG. 4 is a flow diagram illustrating an example method of operation of communication system 300, as found in FIG. 3. The phases illustrated in FIG. 4 are listed herein parenthetically.

In the example in FIG. 4, BTS 350 transfers overhead information to WCD 330-332 over wireless links 320-322. WCD 333 has not yet initiated communications over wireless link 323 with BTS 350, and is referred to as a "new" WCD in FIG. 3. The overhead information includes non-user communication information and commands related to the operation of the particular wireless communication protocol employed over wireless links 320-322. In this example, since WiMAX protocols are employed, and the overhead information includes preambles, frame control information (FCH), downlink mapping (DL-MAP) and uplink mapping (UL-MAP) information, downlink (DCD) and uplink (UCD) overhead information channel descriptions, among other information.

The overhead information and user communications are also encoded using a modulation scheme. In many examples, the overhead modulation scheme would be different—and determined independently—from any modulation scheme used for user communications. However, the modulation scheme typically employed for overhead information must be of a low order of modulation to ensure that all wireless communication devices in communication with, and attempting to initiate communication through BTS 350, can decode the overhead information properly.

For example, a WCD attempting to initiate communications through BTS 350 must first perform a handshaking, registration, or ranging operation to register with BTS 350. This registration operation includes receiving overhead information from BTS 350, as well as transferring overhead information to BTS 350. However, if the WCD attempting to initiate communications does not know the modulation scheme employed for overhead communications for BTS 350, the overhead information received from BTS 350 can not be properly decoded or demodulated, nor can overhead information transferred to BTS 350 be properly encoded or modulated.

Thus, a predetermined modulation scheme, of both type and order of modulation, is employed to allow all existing and initiating wireless communication devices to receive and decode the overhead information from BTS 350. The predetermined modulation scheme is also, in typical examples, of a low order of modulation as well as of a less efficient type of modulation.

This low order and low efficiency modulation is selected to ensure that wireless communication devices both near to and far from BTS 350 can properly receive and decode the overhead information. For example, as the order of modulation increases, and consequently the potential bandwidth of communications, the distance over which wireless communications can reliably occur decreases. Therefore, as shown in FIG. 3, since WCD 331 is closer to BTS 350 than WCD 330 and WCD 332, a generally higher order of modulation could potentially be employed for overhead communications with WCD 331. However, obstructions in the line of sight of a wireless link, such as obstruction 370 in wireless link 322, can decrease the potentially supportable order of modulation Likewise, as the type of modulation increases to a more efficient type, the distance over which communications can reliably occur also decreases.

Unfortunately, using a low order and type of modulation can lead to inefficient use of wireless links 320-322, as well as overcrowding of the resources of BTS 350. This low order and type of modulation can also leave less available bandwidth for user communications, as a large portion of the available bandwidth of a wireless link must be dedicated to inefficiently modulated overhead communications.

In this example, with a WiMAX communication protocol employed, certain types of modulation are supported by BTS 350 and WCD 330-333. These modulation types can include the more efficient quadrature-amplitude modulation (QAM) and the less efficient quadrature phase shift keying (QPSK). Also, within some types of modulation, a different order of modulation can exist. The order of modulation typically refers to the number of bits able to be transferred per unit symbol of the particular type of modulation scheme. For example, in the QAM type of modulation, an order of 64 would allows for 64 bits of data for every encoded piece, or symbol, of communications, and would be referred to as 64-QAM. Other orders and types of modulation would have a similar representation.

In the example in FIG. 4, an original, or first, modulation scheme is used to encode the overhead information. In this example, the first modulation scheme is a QPSK type and of a lower order. This modulation scheme is also predetermined and stored, possibly on a computer-readable medium, in each of WCD 330-332.

BTS 350 receives (401) signal quality information from WCD 330-332. In this example, WCD 333 has not yet initiated communications through BTS 350, and signal quality information would not yet be available. The signal quality information for WCD 330-332 could be received over wireless links 320-322, and in this example is transferred by WCD 330-332 over a channel quality indicator channel (CQICH) within wireless links 320-322.

BTS 350 processes (402) the signal quality information to determine a new, or second, modulation scheme for overhead information exchanged between WCD 330-332 and BTS 350. In this example, the new modulation scheme is determine to allow the overhead information to be decoded by each of WCD 330-332, but still be of a higher order, or more efficient type, of modulation than the original modulation scheme.

The signal quality information will allow BTS 350 to make a determination on how high of an order of modulation or type of modulation could be potentially employed successfully. The signal quality information, in typical examples, depends upon factors such as the distance of WCD 330-332 from BTS 350, the amount or type of obstructions in the line-of-sight of wireless links 320-322, weather, temperature, ground cover, the transceiver equipment of both BTS 350 and WCD 330-332, or other factors in communication system 300.

Figure 5:
FIG. 5 is a table illustrating example modulation schemes.

As shown in FIG. 5, table 500 illustrates example signal quality and overhead modulation scheme information for WCD 330-333. As shown in table 500, the signal quality for existing WCD 330 is low, and the highest supportable overhead modulation scheme is 16-QAM, based upon the signal quality information. The signal quality for existing WCD 331 is high, and the highest supportable overhead modulation scheme is 64-QAM, based upon the signal quality information. The signal quality for existing WCD 332 is medium, and the highest supportable overhead modulation scheme is 16-QAM, based upon the signal quality information. Although WCD 332 is not very distant from BTS 350, in this example, obstruction 370 plays a role in the signal quality, and thus the highest supportable overhead modulation scheme.

According to table 500, the highest supportable overhead modulation scheme that is supported by existing WCD 330-332 is 16-QAM. Therefore, BTS 350 selects 16-QAM as the new overhead modulation scheme. Although only three indicators of signal quality are used in the example found in FIG. 5—low, medium, and high—it should be understood that other indicators, such as a decibel level, volts-per-meter, watts, or other indicator could be used to indicate a signal quality.

BTS 350 then transfers (403) an indicator of the new modulation scheme to WCD 330-332 over wireless links 320-322. In this example, the indicator is transferred in the DCD or UCD portion of the overhead communications over wireless links 120-121. The modulation scheme would be received by all wireless communication devices in communication with BTS 350, such as WCD 330-332.

BTS 350 then transfers (404) the overhead information to WCD 330-332 encoded with the new modulation scheme. This new modulation scheme is used to encode and transfer the overhead information for a period of time. In further examples, WCD 330-332 also transfer overhead information to BTS 350 encoded with the new modulation scheme. Also, as conditions in communication system 300 change, such as the factors discussed above which impact the signal quality information, BTS 350 may process subsequent signal quality information transferred from WCD 330-332 to determine a suitable modulation scheme.

Advantageously, once the modulation scheme employed for the overhead communications over wireless links 320-322 has been increased to a more efficient modulation type or a higher order of modulation, more efficient use of the wireless resources of wireless links 320-322 can be achieved. In this manner, more bandwidth could then be available for user communications, or to allow more wireless communication devices to communicate with BTS 350, among other advantages.

After a period of time, BTS 350 transfers (405) an indicator of the original modulation scheme for the overhead information. As with the previous transfer of the indicator in phase 403, the DCD or UCD portion of the overhead information could be used to transfer the indicator of the original modulation scheme. WCD 330-332 would then receive this indicator of the modulation scheme for the overhead information.

This reversion back to the original modulation scheme is done to facilitate the initiation of new wireless communication devices seeking to register with BTS 350 since the new wireless communication devices would not normally be aware of the second, or new, modulation scheme, and only of the original, or predetermined, modulation scheme. Once WCD 330-332 as well as BTS 350 has reverted back to the original modulation scheme, wireless communication devices seeking to initiate communications with BTS 350 as well as existing WCD 330-332 would be able to properly decode the overhead communications transferred form BTS 350.

BTS 350 could now detect (406) any new wireless communication devices seeking to initiate communications. In this example, WCD 333 is attempting to initiate communications over wireless link 323. To facilitate the initiation of WCD 333 as well as to continue communications with WCD 330-332, BTS would then transfer (407) overhead information encoded with the original modulation scheme.

Once WCD 333 has been registered and initiated to communicate with BTS 350, BTS 350 could again attempt to determine a higher order of modulation, or a more efficient modulation type, for the overhead information exchanged between BTS 350 and WCD 330-332, as well as the new WCD 333. BTS 350 would then receive (401) signal quality information from WCD 330-332 to determine the different modulation scheme. However, in addition to information transferred from existing WCD 330-332 over a channel quality indicator channel, BTS 350 could also use information from the registration and initiation process for WCD 333 to determine a signal quality for WCD 333. Table 500, as found in FIG. 5, illustrates an example signal quality level and supportable overhead modulation scheme for new WCD 333. As seen in table 500, a new modulation scheme of 16-QAM remains the highest supportable modulation scheme across all wireless communication devices in communication with BTS 350, and could be selected for encoding overhead communications. The process listed above for phases 401-407 could be repeated throughout the operation of communication system 300.

In further examples, only certain portions of the overhead information may need to revert to lower order modulation schemes to accommodate the initialization of new wireless communication devices. For example, in WiMAX examples, the DL-MAP and UL-MAP portions of the overhead information could operate with a different modulation scheme than the DCD and UCD, or other portions, without regard to new wireless communication devices, except to accommodate a lower commonly supported modulation scheme as signal qualities indicate. However, since the DCD and UCD portions, in many examples, are used during the initialization and registration process of a new wireless communication device with BTS 350, a reversion to the original modulation scheme may be necessary periodically, as indicated herein.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of transferring first overhead information in a wireless communication system, wherein the first overhead information is encoded with a first modulation scheme, and wherein the first overhead information is wirelessly transferred to a plurality of wireless communication devices in communication with the wireless communication system, the method comprising:
   receiving signal quality information from each of the plurality of wireless communication devices;
   processing the signal quality information to determine a second modulation scheme for the first overhead information, wherein the second modulation scheme is determined to allow the first overhead information to be decoded by each of the plurality of wireless communication devices, and the second modulation scheme is of a higher order of modulation than the first modulation scheme;
   transferring an indicator of the second modulation scheme to the plurality of wireless communication devices;
   transferring the first overhead information to the plurality of wireless communication devices encoded with the second modulation scheme; and
   transferring only a portion of the overhead information in the first modulation scheme to accommodate the initialization of a new wireless communication device.

2. The method of claim 1, wherein receiving the signal quality information from each of the plurality of wireless communication devices comprises receiving the signal quality information over a channel quality information channel from each of the plurality of wireless communication devices.

3. The method of claim 1, wherein the plurality of wireless communication devices comprises new wireless communication devices not yet registered with the wireless communication system, and further comprising:
   receiving ranging information for the new wireless communication devices;
   processing the ranging information to determine the signal quality information for the new wireless communication devices.

4. The method of claim 1, wherein the plurality of wireless communication devices comprises new wireless communication devices not yet registered with the wireless communication system, and further comprising:
   periodically transferring an indicator of the first modulation scheme to the plurality of wireless communication devices, wherein the first modulation scheme is of a lower order of modulation than the second modulation scheme; and
   transferring the first overhead information to the plurality of wireless communication devices using the first modulation scheme.

5. The method of claim 4, further comprising:
   registering the new wireless communication devices with the wireless communication system.

6. The method of claim 5, further comprising:
   receiving ranging information for the new wireless communication devices;
   processing the ranging information to determine the signal quality information for the new wireless communication devices.

7. The method of claim 1, wherein transferring the indicator of the new modulation scheme to the plurality of wireless communication devices comprises transferring the indicator of the new modulation scheme in a downlink overhead information channel to the plurality of wireless communication devices.

8. The method of claim 1, further comprising:
   processing the signal quality information to determine an error correction scheme for the first overhead information, wherein the error correction scheme is determined to allow the first overhead information to be error corrected by each of the plurality of wireless communication devices;
   transferring an indicator of the error correction scheme to the plurality of wireless communication devices; and
   transferring the first overhead information to the plurality of wireless communication devices using the error correction scheme.

9. The method of claim 1, wherein the first modulation scheme is predetermined and stored in each of the plurality of wireless communication devices.

10. The method of claim 1, wherein the second modulation scheme is of a more efficient type of modulation than the first modulation scheme.

11. The method of claim 1, wherein transferring only a portion of the overhead information in the first modulation scheme further comprises transferring downlink mapping information and uplink mapping information of the overhead information in the first modulation scheme and transferring the remainder of the overhead information in the second modulation scheme to accommodate the initialization of a new wireless communication device.

12. The method of claim 1, wherein transferring only a portion of the overhead information in the first modulation scheme further comprises transferring downlink channel descriptor information and uplink channel descriptor information of the overhead information in the first modulation scheme and transferring the remainder of the overhead information in the second modulation scheme to accommodate the initialization of a new wireless communication device.

13. A communication system, comprising:
   a plurality of wireless communication devices in communication with a wireless communication system;
   the wireless communication system configured to encode first overhead information with a first modulation scheme, and wirelessly transfer the first overhead information to the plurality of wireless communication devices;
   the wireless communication system configured to receive signal quality information from each of the plurality of wireless communication devices;
   the wireless communication system configured to process the signal quality information to determine a second modulation scheme for the first overhead information, wherein the second modulation scheme is determined to allow the first overhead information to be decoded by each of the plurality of wireless communication devices, and the second modulation scheme is of a higher order of modulation than the first modulation scheme;
   the wireless communication system configured to transfer an indicator of the second modulation scheme to the plurality of wireless communication devices, and transfer the first overhead information to the plurality of wireless communication devices encoded with the second modulation scheme; and
   the wireless communication system configured to transfer only a portion of the overhead information in the first modulation scheme to accommodate the initialization of a new wireless communication device.

14. The communication system of claim 13, the wireless communication system configured to receive the signal quality information over a channel quality information channel from each of the plurality of wireless communication devices.

15. The communication system of claim 13, wherein the plurality of wireless communication devices comprises new wireless communication devices not yet registered with the wireless communication system, and comprising:
the wireless communication system configured to receive ranging information for the new wireless communication devices and process the ranging information to determine the signal quality information for the new wireless communication devices.

16. The communication system of claim 13, wherein the plurality of wireless communication devices comprises new wireless communication devices not yet registered with the wireless communication system, and comprising:
the wireless communication system configured to periodically transfer an indicator of the first modulation scheme to the plurality of wireless communication devices, wherein the first modulation scheme is of a lower order of modulation than the second modulation scheme, and transfer the first overhead information to the plurality of wireless communication devices using the first modulation scheme.

17. The communication system of claim 16, comprising:
the wireless communication system configured to register the new wireless communication devices with the wireless communication system.

18. The communication system of claim 17, comprising:
the wireless communication system configured to receive ranging information for the new wireless communication devices and process the ranging information to determine the signal quality information for the new wireless communication devices.

19. The communication system of claim 13, comprising:
the wireless communication system configured to transfer the indicator of the new modulation scheme in a downlink overhead information channel to the plurality of wireless communication devices.

20. The communication system of claim 13, comprising:
the wireless communication system configured to process the signal quality information to determine an error correction scheme for the overhead information, wherein the error correction scheme is determined to allow the first overhead information to be error corrected by each of the plurality of wireless communication devices;
the wireless communication system configured to transfer an indicator of the error correction scheme to the plurality of wireless communication devices and transfer the first overhead information to the plurality of wireless communication devices using the error correction scheme.

21. The communication system of claim 13, wherein the first modulation scheme is predetermined and stored in each of the plurality of wireless communication devices.

22. The communication system of claim 13, wherein the second modulation scheme is of a more efficient type of modulation than the first modulation scheme.

* * * * *